United States Patent
Wu et al.

(10) Patent No.: US 12,041,623 B2
(45) Date of Patent: Jul. 16, 2024

(54) RANDOM ACCESS METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zuomin Wu, Guangdong (CN); Weijie Xu, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/409,618

(22) Filed: Aug. 23, 2021

(65) Prior Publication Data

US 2021/0385854 A1    Dec. 9, 2021

Related U.S. Application Data

(63) Continuation of application No. PCT/CN2019/079763, filed on Mar. 26, 2019.

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0013* (2013.01); *H04W 72/1273* (2013.01); *H04W 74/02* (2013.01)

(58) Field of Classification Search
CPC ......... H04W 72/1289; H04W 72/1273; H04W 74/02; H04L 1/0013
See application file for complete search history.

(56) References Cited

U.S. PATENT DOCUMENTS

2018/0115983 A1   4/2018 Harada et al.
2018/0205516 A1   7/2018 Jung et al.
(Continued)

FOREIGN PATENT DOCUMENTS

CN    106465401 A    2/2017
CN    109496458 A    3/2019
(Continued)

OTHER PUBLICATIONS

3GPP TSG RAN WG1 #96—R1-1903436—Athens, Greece, Feb. 25-Mar. 1, 2019—ZTE, Summary of 7.2.1.2 Procedure for Two-step RACH (12 pages).
(Continued)

*Primary Examiner* — Khaled M Kassim
*Assistant Examiner* — Zhaohui Yang
(74) *Attorney, Agent, or Firm* — Perkins Coie LLP

(57) ABSTRACT

The embodiments of the present application relate to a random access method, a terminal device and a network device, the method comprising: a terminal device sending a first message to a network device, the first message comprising a random access preamble and a first physical uplink shared channel (PUSCH), the first PUSCH comprising data obtained by carrying out rate matching on a first transmission block; and the terminal device receiving first downlink control information (DCI) or second DCI sent by the network device for the first message. The random access method, terminal device and network device of the embodiments of the present application may allow a terminal to distinguish between two conditions under which a network device receives a first message within a two-step random access process.

6 Claims, 6 Drawing Sheets

(51) Int. Cl.
*H04W 72/1273* (2023.01)
*H04W 74/02* (2009.01)

(56) References Cited

U.S. PATENT DOCUMENTS

| | | | |
|---|---|---|---|
| 2018/0279375 | A1 | 9/2018 | Jeon et al. |
| 2019/0207737 | A1* | 7/2019 | Babaei ................ H04W 24/08 |
| 2020/0107372 | A1* | 4/2020 | Agiwal ................ H04W 80/02 |
| 2021/0051736 | A1* | 2/2021 | Jeon ..................... H04W 76/11 |
| 2021/0243777 | A1* | 8/2021 | Tsai ..................... H04W 72/14 |
| 2021/0329703 | A1* | 10/2021 | Yang ..................... H04L 5/001 |
| 2022/0060276 | A1* | 2/2022 | Chen ................... H04L 5/0044 |
| 2022/0190906 | A1* | 6/2022 | Haghighat ............ H04W 76/19 |

FOREIGN PATENT DOCUMENTS

| | | | | |
|---|---|---|---|---|
| WO | 2016163504 | A1 | 10/2016 | |
| WO | WO-2017192793 | A1 * | 11/2017 | ........... H04L 1/1864 |
| WO | 2018103092 | A1 | 6/2018 | |
| WO | 2018188626 | A1 | 10/2018 | |

OTHER PUBLICATIONS

International Search Report issued Dec. 27, 2019 of PCT/CN2019/079763 (4 pages).
Extended European Search Report for European Application No. 19922030.2 issued Dec. 20, 2021. 9 pages.
Examination Report for Indian Application No. 202117038278 issued Apr. 8, 2022. 7 pages with English translation.
Chinese Application No. 202110868871.5 Second Office Action Mailed Dec. 28, 2022, pp. 1-10.
No Author. 3GPP TSG RAN WG1 Meeting #92bis, MediaTek Inc., "Remaining Issues on DCI Contents and Formats Document for: Discussion and Decision," Agenda Item 7.1.3.1.4, R1-1804045, pp. 1-9.
AT&T "On the necessity of rate-matching resources in NR-SIB1" R2-1812409; 3GPP TSG RAN WG2 Meeting #103; Gothenburg, Sweden; Aug. 20-24, 2018. 11 pages.
CAICT "Considerations on Resource Pool Design for PUSCH in MsgA of 2-step Rach" R1-1902917; 3GPP TSG RAN WG1 Meeting #96; Athens Greece; Feb. 25-Mar. 1, 2019. 5 pages.
First Office Action for Chinese Application No. 202110868871.5 issued Sep. 19, 2022. 15pages with English translation.
MediaTek Inc. "Discussion on NR-U configured grant" R1-1901801; 3GPP TSG RAN WG1 #96; Athens, Greece; Feb. 25-Mar. 1, 2019. 7 pages.
MediaTek Inc. "Further considerations on 2-step RACH" R2-1813965; 3GPP TSG-RAN WG2 Meeting #103bis. 9 pages.
Notice of Reasons for Refusal for Japanese Application No. 2021-556928 issued Jul. 15, 2022. 6 pages with English translation.
Samsung "Channel Structure for Two-Step RACH" R1-1902241; 3GPP TSG RAN WG1 #96; Athens, Greece; Feb. 25-Mar. 1, 2019. 6 pages.
Vivo "Discussion on channel structure for 2-step RACH" R1-1901669; 3GPP TSG RAN WG1 #96; Athens, Greece; Feb. 25-Mar. 1, 2019. 7 pages.
Vivo "Views on 2-step RACH design" R1-1901671; 3GPP TSG RAN WG1 #96; Athens, Greece; Feb. 25-Mar. 1, 2019. 6 pages.

* cited by examiner

RANDOM ACCESS METHOD, TERMINAL DEVICE AND NETWORK DEVICE

CROSS-REFERENCE TO RELATED APPLICATION

The present application is a continuation application of International PCT Application No. PCT/CN2019/079763, filed on Mar. 26, 2019, the entire content of which is hereby incorporated by reference.

TECHNICAL FIELD

The present application relates to the field of communication, and more particularly, to a random access method, a terminal device and a network device.

BACKGROUND

A two-step random access procedure may be adopted in a new radio (NR) system (or referred to as a 5G system or 5G network). In the two-step random access procedure, message 1 (Msg1) and message 3 (Msg 3) in a four-step random access procedure may be sent as a first message (Msg A) in the two-step random access procedure, and message 2 (Msg2) and message 4 (Msg 4) in the four-step random access procedure may be sent as a second message (Msg B) in the two-step random access procedure.

Since the first message sent by a terminal device includes a random access preamble and a physical uplink shared channel (PUSCH), there may be two situations when a network device receives the first message. In this case, how the terminal device distinguishes between the two situations has not been clearly specified at present.

SUMMARY

Embodiments of the present application provide a random access method, a terminal device and a network device, so that in a two-step random access procedure the terminal device can distinguish between two situations when the network device receives a first message.

In a first aspect, there is provided a random access method. The random access method includes: a terminal device sends a first message to a network device, wherein the first message includes a random access preamble and a first physical uplink shared channel (PUSCH), and the first PUSCH includes data obtained by performing rate-matching on a first transport block; and the terminal device receives first downlink control information (DCI) or second DCI sent by the network device for the first message.

In a second aspect, there is provided a random access method. The random access method includes: a network device receives a first message sent by a terminal device, wherein the first message includes a random access preamble and a first physical uplink shared channel (PUSCH), and the first PUSCH includes data obtained by performing rate-matching on a first transport block; and the network device sends first downlink control information (DCI) or second DCI to the terminal device according to a result of reception of the first message.

In a third aspect, there is provided a terminal device configured to perform the method according to the first aspect described above or any of various implementations thereof. Specifically, the terminal device includes function modules configured to perform the method according to the first aspect described above or any of various implementations thereof.

In a fourth aspect, there is provided a network device configured to perform the method according to the second aspect described above or any of various implementations thereof.

Specifically, the network device includes functional modules configured to perform the method according to the second aspect described above or any of various implementations thereof.

In a fifth aspect, there is provided a terminal device including a processor and a memory. The memory is configured to store a computer program, and the processor is configured to invoke and run the computer program stored in the memory to perform the method according to the first aspect described above or any of various implementations thereof.

In a sixth aspect, there is provided a network device including a processor and a memory. The memory is configured to store a computer program, and the processor is configured to invoke and run the computer program stored in the memory to perform the method according to the second aspect described above or any of various implementations thereof.

In a seventh aspect, there is provided a chip configured to implement the method according to any one of the first and second aspects described above or any of various implementations thereof.

Specifically, the chip includes a processor configured to invoke and run a computer program from a memory, to enable a device having the chip installed thereon to perform the method according to any one of the first and second aspects described above or any of various implementations thereof.

In an eighth aspect, there is provided a computer readable storage medium for storing a computer program that enables a computer to perform the method according to any one of the first and second aspects described above or any of various implementations thereof.

In a ninth aspect, there is provided a computer program product including computer program instructions that enable a computer to perform the method according to any one of the first and third aspects described above or any of various implementations thereof.

In a tenth aspect, there is provided a computer program, which, when running on a computer, enable the computer to perform the method according to any one of the first and third aspects described above or any of various implementations thereof.

According to the above technical schemes, in the two-step random access procedure, after the terminal device sends the first message to the network device, the network device may send different DCIs to the terminal device according to different situations when the first message is received, and after receiving the different DCIs, the terminal device can distinguish effectively between the two situations when the network device receives the first message, so that a subsequent procedure in the two-step random access procedure can be performed for different situations when the network device receives the first message.

DETAILED DESCRIPTION

Technical schemes in embodiments of the present application will be described below with reference to the drawings in the embodiments of the present application. It is apparent that the embodiments described are just some of the embodiments of the present application, but not all of the embodiments of the present application. According to the embodiments of the present application, all other embodiments achieved by a person of ordinary skill in the art without making inventive efforts are within the protection scope of the present application.

The embodiments of the present application can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a next generation communication system or other communication systems.

Generally speaking, traditional communication systems support a limited quantity of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, and the embodiments of the present application may also be applied to these communication systems.

In some embodiments, a communication system in the embodiments of the present application may be applied to a carrier aggregation (CA) scenario, a dual connectivity (DC) scenario, or a standalone (SA) scenario.

Figure 1:
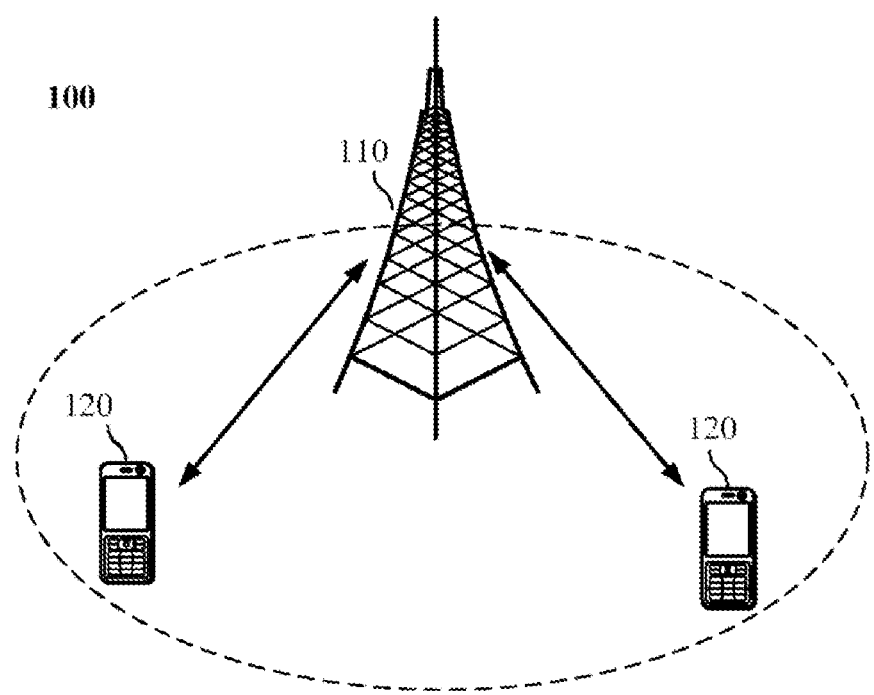
FIG. 1 is a schematic diagram of an architecture of a communication system in accordance with an embodiment of the present application.

Illustratively, a communication system 100 applied in the embodiments of the present application is shown in FIG. 1. The communication system 100 may include a network device 110, which may be a device that communicates with terminal devices 120 (or referred to as communication terminals, or terminals). The network device 110 may provide communication coverage for a specific geographical area, and may communicate with terminal devices located within the coverage area. In some embodiments, the network device 110 may be a base transceiver station (BTS) in a GSM system or CDMA system, a NodeB (NB) in a WCDMA system, an Evolutional Node B (eNB or eNodeB) in an LTE system, or a radio controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a future evolved public land mobile network (PLMN).

The communication system 100 further includes at least one terminal device 120 located within the coverage area of the network device 110. The "terminal device" as used herein includes, but not limited to, a device configured to receive/send communication signals via a wired circuit, for example, via a public switched telephone network (PSTN), a digital subscriber line (DSL), a digital cable, a direct cable, and/or another data connection/network, and/or via a wireless interface, for instance, a wireless interface for a cellular network, a wireless local area network (WLAN), such as a digital television network of a handheld digital video broadcasting-handheld (DVB-H) network, a satellite network, and an amplitude modulation-frequency modulation (AM-FM) broadcast transmitter, and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular phone; a personal communication system (PCS) terminal capable of combining a cellular radio phone with data processing, facsimile, and data communication abilities; a personal digital assistant (PDA) that may include a radio phone, a pager, internet/intranet access, a Web browser, a memo pad, a calendar, a Global Positioning System (GPS) receiver; and a conventional laptop and/or palmtop receiver or other electronic devices including a radio phone transceiver. The terminal device may refer to an access terminal, user equipment (UE), a subscriber unit, a subscriber station, a mobile station, a mobile site, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN).

The network device 110 may provide services for a cell, and the terminal device 120 communicates with the network device 110 through transmission resources (e.g., frequency domain resources or spectrum resources) used by the cell. The cell may be a cell corresponding to the network device 110 (e.g., a base station). The cell may be a macro base station, or a base station corresponding to a small cell. The small cell herein may include, for example, a metro cell, a micro cell, a pico cell, a femto cell, etc., which have characteristics such as small coverage range and low transmission power, and are suitable for providing high-speed data transmission services.

FIG. 1 illustrates exemplarily one network device and two terminal devices. In some embodiments, the communication system 100 may include multiple network devices, and other quantities of terminal devices may be included within the coverage area of each network device, which is not limited in the embodiments of the present application.

In some embodiments, the communication system 100 may include other network entities, such as a network controller and a mobile management entity, which is not limited in the embodiments of the present application.

It should be understood that a device with a communication function in a network/system in the embodiments of the present application may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, and will not be described repeatedly herein. The communication device may also include other devices in the communication system 100, for example other network entities, such as network controllers and mobile management entities, which is not limited in the embodiments of the present application.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "I" herein generally indicates that there is a "or" relationship between the associated objects before and after "I".

After a cell search procedure, a terminal device has achieved downlink synchronization with a cell, so the terminal device can receive downlink data. However, the terminal device can perform uplink transmission only after it is synchronized with the cell on uplink. The terminal device may establish a connection with the cell through a random access procedure and achieve uplink synchronization.

The random access procedure may usually be triggered by the following events.

(1) Initial access.

The terminal device may enter a radio resource control connected (RRC_CONNECTED) status from a radio resource control idle (RRC_IDLE) status.

(2) Radio resource control (RRC) connection re-establishment procedure.

(3) Handover.

In this case, the terminal device is in a connected status and needs to establish uplink synchronization with a new cell.

(4) DL or UL data arrival during RRC_CONNECTED when UL synchronization status is "non-synchronised".

(5) UL data arrival during RRC_CONNECTED when there are no physical uplink control channel (PUCCH) resources for scheduling request (SR) available.

(6) SR failure.

(7) Request by RRC upon synchronous reconfiguration.

(8) Transition from RRC_INACTIVE of the terminal device.

(9) To establish time alignment at SCell addition.

(10) The terminal device requests other system information (OSI).

(11) The terminal device needs to perform beam failure recovery.

Figure 2:
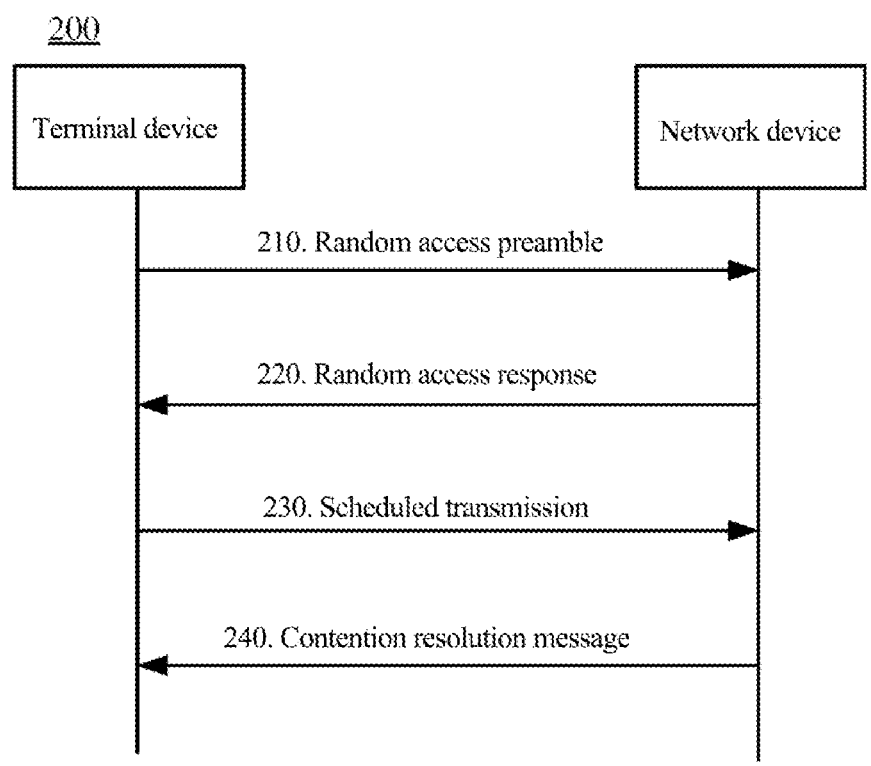
FIG. 2 is a schematic flow chart of a four-step random access approach in accordance with an embodiment of the present application.

Two random access modes may be supported in an NR system, that is, a contention based random access mode (as shown in FIG. 2), and a non-contention based random access mode. To facilitate understanding of the schemes of the embodiments of the present application, a contention based four-step random access procedure will be described briefly below with reference to FIG. 2.

In step one, a terminal device sends a preamble (i.e., message 1, Msg1) to a network device.

The random access preamble may also be called a preamble, random access preamble sequence, or preamble sequence, etc.

Specifically, the terminal device may select physical random access channel (PRACH) resources, which may include time domain resources, frequency domain resources and code domain resources. Next, the terminal device may send the selected preamble on the selected PRACH resources. The network device may estimate a transmission delay between itself and the terminal device according to the preamble, and calibrate uplink timing accordingly.

In step two, the network device sends a random access response (RAR), i.e., message 2 (Msg2), to the terminal device.

After detecting the preamble sent by the terminal device out, the network device may send an RAR to the terminal device to inform the terminal device of uplink resource information that may be used when Msg3 is sent. The RAR may include information such as a preamble identifier, time advance (TA), an uplink grant, and a temporary cell radio network temporary identifier (TC-RNTI).

Accordingly, after the terminal device sends the preamble to the network device, the terminal device may start an RAR window and detect the RAR in the RAR window. If the terminal device does not detect the RAR out in the RAR window, the terminal device may perform retransmission of the preamble sequence. If the terminal device detects the RAR out in the RAR window, the terminal device may perform transmission of a Msg3 according to the UL grant indicated by the RAR.

The terminal device detects the RAR. Specifically, the terminal device may detect a corresponding physical downlink control channel (PDCCH) according to a random access radio network temporary Identifier (RA-RNTI). The PDCCH scrambled by the RA-RNTI schedules a physical downlink shared channel (PDSCH) which includes the RAR corresponding to the preamble.

That the terminal device does not detect the RAR out mentioned above may include the following several situations: situation a. the terminal device does not detect the PDCCH scrambled by the RA-RNTI out; situation b. the terminal device detects the PDCCH scrambled by the RA-RNTI out, but fails to decode a PDSCH scheduled by the PDCCH; and situation c. the terminal device decodes the PDSCH, but the PDSCH does not include an RAR message corresponding to the preamble.

That the terminal device detects the RAR out may include the terminal device decodes the PDSCH scheduled by the PDCCH scrambled by the RA-RNTI, the PDSCH includes at least one RAR message, and one of the at least one RAR message is a response to the preamble sent by the terminal device.

In some embodiments, a value of the RA-RNTI may be calculated through positions of the time-frequency resources of the preamble which are explicit to both a sender and a receiver. For example, the RA-RNTI associated with the preamble may be calculated by formula (1):

$$RA\text{-}RNTI = 1 + s\_id + 14 \times t\_id + 14 \times 80 \times f\_id + 14 \times 80 \times 8 \times ul\_carrier\_id \quad (1)$$

where s_id is an index of a first orthogonal frequency division multiplexing (OFDM) symbol of a PRACH resource (0≤s_id<14), t_id is an index of a first slot of the PRACH resource in a system frame (0≤t_id<80), fid is an index of the PRACH resource in the frequency domain (0≤f_id<8), and ul_carrier_id is an uplink carrier for transmitting the preamble (0 represents a NUL carrier and 1 represents an SUL carrier). For FDD, there is only one PRACH resource per subframe, so f_id is fixed as 0.

The RAR sent by the network device may be carried in a media access control (MAC) protocol data unit (PDU). Information carried in the RAR will be described from a perspective of a structure of the MAC PDU including the RAR with reference to FIG. 3.

Figure 3:
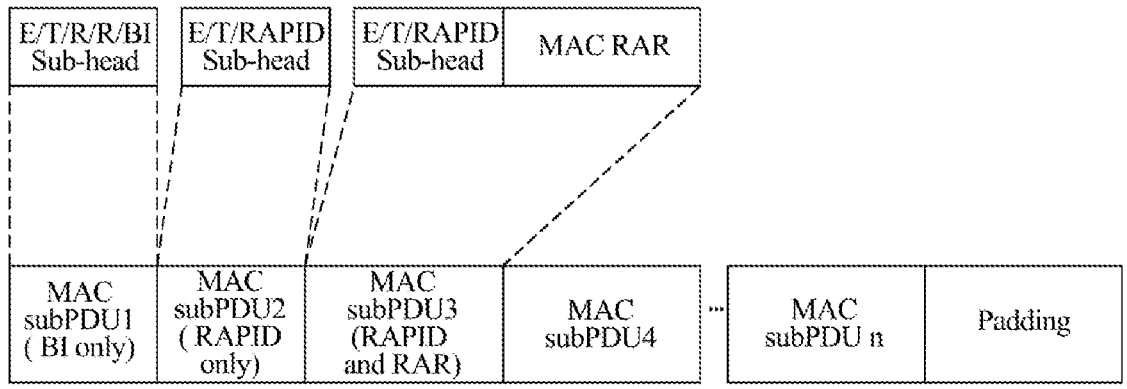
FIG. 3 is a schematic diagram of a MAC PDU including an RAR in accordance with an embodiment of the present application.

It can be seen from FIG. 3 that one MAC PDU may include one or more MAC sub-PDUs and possible padding bits, and one MAC sub-PDU may have a backoff indicator (BI) only, or a random access preamble identifier (RAPID) only, or both a RAPID and a MAC RAR.

It can be seen from the structure of the MAC PDU that if the network device detects random access requests out from multiple terminal devices on the same PRACH resource, responses to these access requests may be made by using one MAC PDU, the response to each random access request (corresponding to one preamble index) corresponds to one RAR. In other words, if the multiple terminal devices send preambles on the same PRACH resource (time-frequency positions are the same and the same RA-RNTI is used), the corresponding RARs are multiplexed in the same MAC PDU. That is, all terminal devices that use the same PRACH resource to send the preambles (which are not necessarily the same) detect the PDCCH scrambled by the same RA-RNTI and receive the same MAC PDU, but different RAPIDs correspond to different RARs.

The scrambling can be performed on the MAC PDU only using one RA-RNTI, which means that RARs corresponding to the preambles sent using different PRACH resources (time-frequency positions are different) cannot be multiplexed into the same MAC PDU.

A BI sub-header in a MAC PDU may include an extension field (E), a type field (T), two reserved fields (Rs), and a BI value. The BI sub-header only appears once and is located at a first sub-header of a MAC header. If receiving one BI sub-header, the terminal device will save a backoff value which is equal to a value corresponding to a BI in this header; otherwise, the terminal device may set the backoff value as 0. The value corresponding to the BI specifies a time range for which the terminal device needs to wait before retransmitting the preamble. If the terminal device does not receive an RAR within the RAR window, or none of RAPIDs in the received RARs matches with a preamble index selected by itself, it can be considered that this reception of the RAR fails. In this case, the terminal device needs to wait for a period of time and then initiate random access. The waiting time may be any random value within a waiting time interval specified by 0 and the value corresponding to the BI.

A RAPID sub-header in the MAC PDU may include an E, a T and a RAPID value. The RAPID is a received preamble index to which the network device responds. If the terminal device finds that the value is the same as an index used when it sends the preamble, it can be considered that the corresponding RAR is received successfully.

Figure 4:
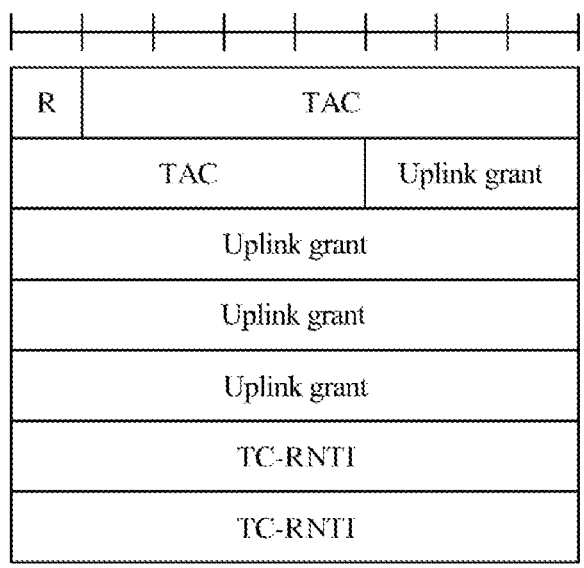
FIG. 4 is a schematic block diagram of a MAC RAR in accordance with an embodiment of the present application.

FIG. 4 is a schematic block diagram of a MAC RAR in accordance with an embodiment of the present application. As shown in FIG. 4, the MAC RAR may include a reserved bit R (e.g., 1 bit), a timing advance command (TAC), an UL grant, and a TC-RNTI. The TAC may be used for specifying a time adjustment amount required for uplink synchronization of the terminal device, and occupies 12 bits. The UL grant occupies 27 bits and may be used for indicating an uplink resource to schedule Msg3. The TC-RNTI occupies 16 bits, and may be used for scrambling PDCCH of Msg 4.

The UL grant of 27 bits in each MAC RAR may include PUSCH frequency resource allocation, PUSCH time resource allocation, modulation and coding scheme (MCS), channel status information (CSI), etc., which may be shown specifically in Table 1.

TABLE 1

| RAR grant field | Number of bits |
| --- | --- |
| Frequency hopping flag | 1 |
| PUSCH frequency resource allocation | 14 |
| PUSCH time resource allocation | 4 |
| MCS | 4 |
| Transmit power control command for PUSCH | 3 |
| CSI request | 1 |

In step three, the terminal device sends a Msg3.

After receiving the RAR message, the terminal device determines whether the RAR is its own RAR message. For example, the terminal device may check this using the preamble index. After the terminal device determines that the RAR is its own RAR message, it may generate a Msg3 at an RRC layer and send the Msg3, which needs to carry identifier information of the terminal device, to the network device. A redundancy version (RV) number used for transmission of Msg3 scheduled by the UL grant in the RAR is 0.

The Msg3 is mainly used for notifying the network device of triggering events of the random access. For different triggering events of the random access, the Msg3 sent by the terminal device in step three may include different contents.

For example, for an initial access scenario, the Msg3 may include an RRC setup request generated on the RRC layer. In addition, the Msg3 may also carry, for example, a 5G serving-temporary mobile subscriber identity (S-TMSI) of the terminal device or a random number.

As another example, for an RRC connection reestablishment scenario, the Msg3 may include an RRC connection reestablishment request generated on the RRC layer. In addition, the Msg3 may also carry, for example, a cell radio network temporary identifier (C-RNTI).

As another example, for a handover scenario, the Msg3 may include an RRC handover confirm message generated on the RRC layer, which carries the C-RNTI of the terminal device. In addition, the Msg3 may also carry information such as a buffer status report (BSR). For other triggering events, such as an uplink/downlink data arrival scenario, the Msg3 may at least include the C-RNTI of the terminal device.

Step three supports the hybrid automatic repeat request (HARQ). If the network device fails to receive the Msg3, the network device may schedule retransmission of MSG3 using a downlink control information (DCI) format 0_0 scrambled by the TC-RNTI.

The DCI format 0_0 scrambled by the TC-RNTI may include: an uplink and downlink DCI indicator (1 bit), frequency resource allocation, time resource allocation (4 bits), a frequency hopping flag (1 bit), MCS (5 bits), a new data indicator (NDI) (1 bit reserved), an RV (2 bits), a HARQ process number (4 bits reserved), a transmit power control command for PUSCH (2 bits), and an UL/supplement UL (SUL) carrier indicator (1 bit). A size of the frequency resource allocation may be determined according to an uplink band width part (BWP).

In step four, the network device sends a Msg4 to the terminal device.

The Msg4 may include a contention resolution message and an uplink transmission resource allocated for the terminal device. After receiving the Msg4 sent by the network device, the terminal device may detect whether the Msg4 includes part of contents of the Msg3 sent by the terminal device. If the Msg4 includes part of the contents of the Msg3, it is indicated that a random access procedure of the terminal device is successful; otherwise, it is considered that the random access procedure fails, and the terminal device needs to start to initiate the random access procedure from step one again.

Since the terminal device may carry its own unique identifier in the Msg3 in step three, in the contention resolution mechanism the network device will carry the unique identifier of the terminal device in the Msg4 to designate the terminal device that wins in the contention. Step four supports the HARQ retransmission. After receiving the Msg4, the terminal device performs physical uplink control channel (PUCCH) feedback. If a decoding result of the Msg4 received by the terminal device is a negative acknowledgment (NACK), the network device may perform HARQ retransmission for the Msg4. Exemplarily, the network device may use a DCI format 1_0 scrambled by the C-RNTI or TC-RNTI to schedule initial transmission or retransmission of the Msg4. The random access is completed if the terminal device receives the DCI format 1_0 scrambled by the C-RNTI and its corresponding PDSCH. If the terminal device receives the DCI format 1_0 scrambled by the TC-RNTI and its corresponding PDSCH and comparison of the contents is successful, the random access is completed.

The DCI format 1_0 scrambled by the TC-RNTI may include: an uplink and downlink DCI indicator (1 bit), frequency resource allocation (its size is determined according to a DL BWP), time resource allocation (4 bits), mapping of virtual resource blocks (VRBs) to physical resource blocks (PRBs) (1 bit), MCS (5 bits), NDI (1 bit), an RV (2 bits), a HARQ process number (4 bits), a downlink allocation indicator (DAI) (2 bits reserved), a transmit power control command for PUCCH (2 bits), a PUCCH resource indicator (3 bits), and a PDSCH-to-HARQ feedback time indicator (3 bits).

Figure 5:
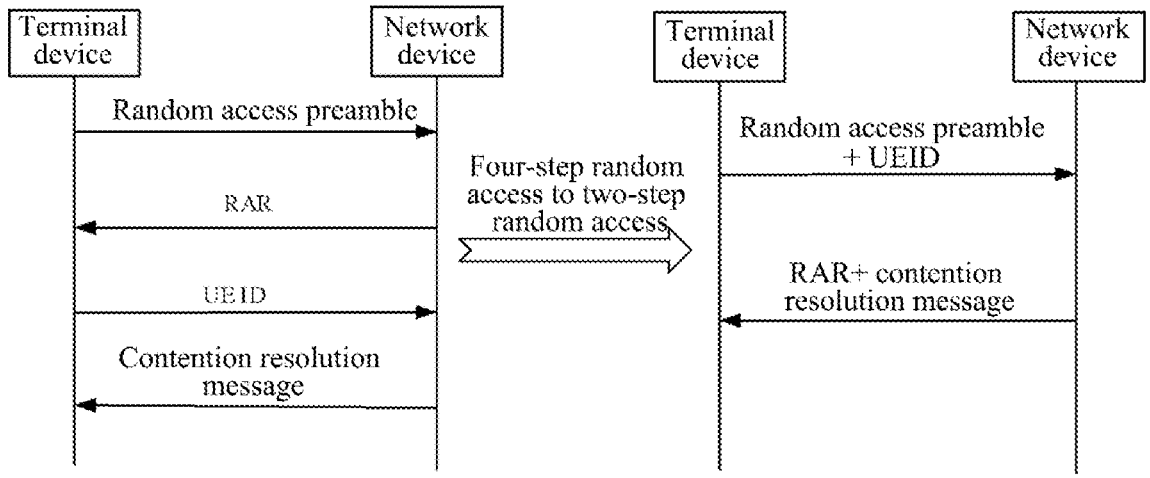
FIG. 5 is a schematic flow chart of changing from four-step random access to two-step random access in accordance with an embodiment of the present application.

Time delay of the four-step random access procedure is relatively large, which is not suitable for low-delay and high-reliability scenarios of the 5G. Considering characteristics of related services with the low-delay and high-reliability, a scheme for the two-step random access procedure is proposed. As shown in FIG. 5, in the two-step random access procedure, simply speaking, the first and third steps of the four-step random access procedure may be regarded as being combined into the first step of the two-step random access procedure, and the second and fourth steps of the four-step random access procedure may be regarded as being combined into the second step of the two-step random access procedure. Therefore, in the first step of the two-step random access procedure, the terminal device needs to send the preamble and PUSCH to the network device. It should be understood that FIG. 5 illustrates only one specific implementation of the two-step random access procedure, and should not limit the protection scope of the present application.

However, since the first message sent by the terminal device includes the preamble and PUSCH, there may be two situations when the network device receives the first message. In this case, how the terminal device distinguishes between the two situations has not been clearly specified at present. In order to solve the above problems, an embodiment of the present application proposes a random access method, which enables the terminal device to distinguish different situations when the network device receives the first message.

Figure 6:
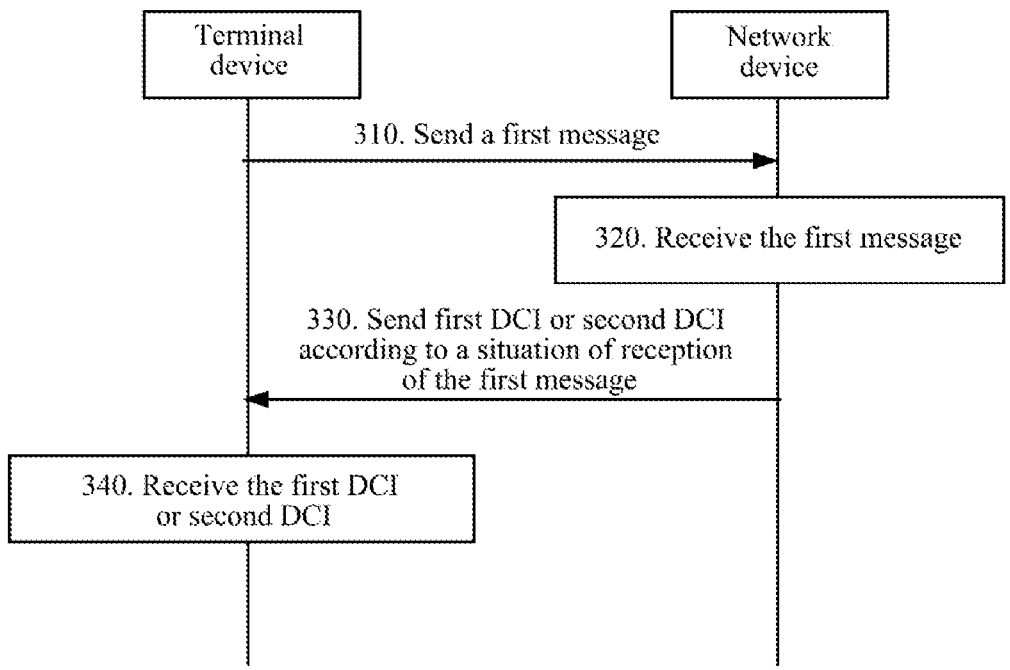
FIG. 6 is a schematic flow chart of a random access method in accordance with an embodiment of the present application.

FIG. 6 is a schematic flow chart of a random access method 300 in accordance with an embodiment of the present application. The method described in FIG. 6 may be performed by a terminal device and a network device, the terminal device may be, for example, the terminal device 120 shown in FIG. 1, and the network device may be, for example, the network device 110 shown in FIG. 1. As shown in FIG. 6, the method 300 may include at least part of the following contents.

In 310, a terminal device sends a first message to a network device, the first message including a preamble and a first PUSCH, and the first PUSCH including data obtained by performing rate-matching on a first transport block.

In 320, the network device receives the first message.

In 330, the network device sends first DCI or second DCI to the terminal device according to a result of reception of the first message.

In 340, the terminal device receives the first DCI or second DCI sent by the network device.

The first message including the preamble and the first PUSCH in 310 may be understood that there is no other message between the network device and the terminal device, from time when the terminal device sends the preamble to the network device to time when the terminal device sends the first PUSCH to the network device, and/or the network device may send a second message to the terminal device for both the preamble and the first PUSCH.

The rate-matching mentioned above may include operations, such as coding, modulation, mapping and precoding. In addition, an identifier of the terminal device may be included in the first transport block. Exemplarily, the identifier of the terminal device may include, but is not limited to, a TC-RNTI, a C-RNTI, a random number with a fixed quantity of bits, a 5G-S-TMSI, etc.

In some embodiments, an RV used when the terminal device sends the first PUSCH may be RV0.

The terminal device sends the first message to the network device, and the network device may receive the first message accordingly. There may be multiple situations when the network device receives the first message.

In situation 1, the network device detects successfully the preamble sequence out, but fails to decode the first transport block.

In situation 2, the network device detects successfully the preamble sequence out, and decodes the first transport block.

In situation 3, the network device neither detects the preamble sequence out nor decodes the first transport block.

Situation 1 and situation 2 are mainly considered in an embodiment of the present application. It should be understood that in situation 3, the network device cannot determine whether the terminal device has sent the first message, so the network device may not do anything for processing in situation 3.

After receiving part or all of the first message, the network device may send a response message to the terminal device according to the result of the reception of the first message. There may be two situations when the network device sends the response information to the terminal device.

In situation A, when the network device detects successfully the preamble sequence out, but fails to decode the first transport block (i.e., situation 1 when the network device receives the first message), the network device cannot determine which terminal device sent the first message. In this case, the network device may send the first DCI to the terminal device to enable the terminal device to retransmit the first transport block.

In some embodiments, the network device may send the first DCI to the terminal device using a first control resource set (CORESET), or may send the first DCI to the terminal device using other resources. In this case, the terminal device receives the first DCI by detecting a physical downlink control channel (PDCCH) on the CORESET or other resources. The CORESET may be preset on the terminal device based on the protocol, or may be preconfigured to the terminal device by the network device.

The PDCCH mentioned in the embodiments of the present application may also be an enhanced physical downlink control channel (EPDCCH), a machine type communication physical downlink control channel (MPDCCH), a physical sidelink control channel (PSCCH) or a narrowband physical downlink control channel (NPDCCH), which are not specifically limited in the embodiments of the present application.

In some embodiments, the first DCI may be used for scheduling the first PDSCH, the first PDSCH includes the response information for the preamble; or the first DCI may include the response information for the preamble.

The response information for the preamble may include, but is not limited to, at least one of: an identifier of the preamble, a TC-RNTI, first RV information, first NDI information, first carrier indicator information, first HARQ process number information, first MCS information and information of transmit power control command for PUSCH. The first RV information may be used for determining a redundancy version of a second PUSCH, the information of transmit power control command for PUSCH may be used for the terminal device to determine transmission power of the second PUSCH according to transmission power of the first PUSCH, and the first carrier indicator information may be used for the terminal device to determine carrier information for transmitting the second PUSCH.

The second PUSCH includes data obtained by performing rate-matching on the first transport block. The first PUSCH and the second PUSCH may be different. It can be understood that transport blocks transmitted by the first PUSCH and the second PUSCH are the same, so the second PUSCH is retransmission for the first PUSCH.

In some embodiments, since the first PUSCH and the second PUSCH transmit the same first transport block, when transmission parameters of the second PUSCH are determined, the size of the first transport block is no longer needed to be determined according to the first MCS information, the first MCS information may only be used for determining a modulation order of the second PUSCH.

According to the technical schemes described above, information indicating the RV and the like, which is used for retransmission, is included in the response information for the preamble, such that the terminal device may directly retransmit the first transport block in the first message after receiving the response information for the preamble.

The response information for the preamble may be carried in a MAC PDU, for example, the MAC PDU as shown in FIG. 3. One MAC PDU may include response information for at least one preamble. If one MAC PDU includes response information for multiple preambles, a size of the response information for each preamble may be fixed and the response information may include an UL grant, for example, as shown in FIG. 4. The information included in each UL grant may be shown in Table 2.

TABLE 2

| Field of response information for Preamble | Number of bits |
| --- | --- |
| Frequency hopping flag | 1 |
| PUSCH frequency resource allocation | 14 |
| PUSCH time resource allocation | 4 |
| MCS | 2 |
| Transmit power control command for PUSCH | 2 |
| CSI request | 1 |
| RV | 2 |
| Carrier indicator | 1 |

It should be understood that specific examples in the embodiments of the present application are only intended to help those skilled in the art to better understand the embodiments of the present disclosure, and not to limit the scope of the embodiments of the present application. For example, the numbers of bits in fields of the response information for the preamble in Table 2 are not limited to the numbers of bits shown in Table 2. As an example, the MCS field in Table 2 occupies 2 bits (for indicating different modulation orders, such as one of q, 2, 4, and 6). Actually, the MCS field may also occupy 5 bits or other numbers of bits. As another example, the RV field in Table 2 occupies 2 bits (for indicating RV0, RV1, RV2, and RV3). Actually, the RV field may also occupy 1 bit (for indicating RV0 or RV2) or other numbers of bits.

It should also be understood that the size of the response information for the preamble in the two-step random access procedure is not specifically limited, that is, the size of the response information for the preamble in the two-step random access procedure may be the same as or different from that of the response information for the preamble in the four-step random access procedure.

In some embodiments, the size of the response information for the preamble in the two-step random access procedure is the same as that of the response information for the preamble in the four-step random access procedure. In some embodiments, information included in the UL grant in the response information for the preamble in the two-step random access procedure is shown in Table 2, and information included in the UL grant in the response information for the preamble in the four-step random access procedure is shown in Table 1. In some embodiments, the response information for the preamble in the two-step random access procedure and the response information for the preamble in the four-step random access procedure include indicator information for distinguishing whether the current response information is for the two-step random access procedure or the four-step random access procedure. For example, the reserved bit R in the MAC RAR may be used for indicating whether the MAC RAR is response information for the two-step random access procedure or for the four-step random access procedure. As another example, Table 1 and Table 2 further include 1-bit information for explicitly indicating whether the current response information is for the two-step random access procedure or for the four-step random access procedure.

With respect to the first carrier indicator information included in the response information for the preamble, further, if the terminal device performs transmission on an unlicensed spectrum, the first carrier indicator information may further be used for determining an unlicensed carrier for sending the second PUSCH. In this case, the response information for the preamble may further include at least one of: indicator information of at least one uplink BWP, indicator information of at least one uplink sub-band, indicator information of at least two time domain resources, indicator information of at least two frequency domain resources, a channel access type corresponding to the second PUSCH, and a channel access priority corresponding to the second PUSCH.

In order to get a deeper understanding of the embodiments of the present application, the unlicensed spectrum will be introduced briefly below.

Unlicensed spectrum is a spectrum divided by countries and regions, which may be used for communication of radio devices. The spectrum may be considered as a shared spectrum, that is, communication devices in different communication systems can use the spectrum and may not apply for proprietary spectrum license from governments, as long as they meet regulatory requirements set on the spectrum by the countries or regions. In order to enable various communication systems for wireless communication using the unlicensed spectrum to coexist friendly on the spectrum, a principle of listen before talk (LBT) needs to be adopted, that is, before the communication devices send signals on a channel of the unlicensed spectrum, channel listening (or channel detection) needs to be performed first, and the communication devices can send the signals only when a result of the channel listening is that the channel is idle. If the result of the channel listening performed by the communication devices on the unlicensed spectrum is that the channel is busy, the signals cannot be sent. Moreover, in order to ensure fairness, in one transmission, duration of signal transmission performed by the communication device using the channel on the unlicensed spectrum may not exceed a maximum channel occupation time (MCOT).

Therefore, in the two-step random access procedure on the unlicensed spectrum, multiple candidate resources in the time domain and/or frequency domain may be included when uplink data or downlink data is retransmitted, so as to increase transmission opportunities when the data is retransmitted.

When an embodiment of the present application is applied to the unlicensed spectrum, the channel access type included in the response information for the preamble may include at least one of category 1 (Cat-1) channel access type, category 2 (Cat-2) channel access type and category 4 (Cat-4) channel access type.

Cat-1 channel access type may mean that transmission is performed immediately after a switching gap ends, that is, whether the channel is idle does not need to be detected, and category 1 channel access type is suitable for transmission switching within one COT. The switching gap may not exceed a certain duration, such as 16 µs.

Cat-2 channel access type may mean that the signals may be sent if the channel is idle within a single detection time, and the signals cannot be sent if the channel is occupied. Cat-4 channel access type may mean random backoff channel access based on a variable contention window size (CWS). In this case, the communication device determines the CWS as a CWp which is a variable value, and the communication device generates a random number N according to a value of the CWp. The communication device performs channel detection on the unlicensed spectrum, and after the channel detections in N slots are all successful, the communication device may send the signals.

Additionally, when the channel access type is Cat-4 channel access type, priorities of channel access schemes may be further determined according to priorities of transmission services. That is to say, Cat-4 channel access type may have different channel access sub-schemes, which may correspond to priorities of different transmission services. Table 3 is an example of channel access parameters corresponding to different channel priorities under Cat-4 channel access type. The smaller a value of P is, the higher the priority is.

TABLE 3

| Channel access priority (p) | $m_p$ | $CW_{min,p}$ | $CW_{max,p}$ | $T_{mcot,p}$ | Allowed value of $CW_p$ |
| --- | --- | --- | --- | --- | --- |
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

After the terminal device sends the first message, the terminal device may start a first timer or start an RAR time window, and receive the first DCI within a duration range of the timer or RAR time window.

In some embodiments, the timer or RAR time window may be preset on the terminal device based on the protocol, or it may be preconfigured to the terminal device by the network device, for example, it may be configured through RRC signaling.

It should be understood that the timer or RAR time window may be started after the preamble is sent, or after the first PUSCH is sent, which is not specifically limited in the embodiments of the present application.

As a possible embodiment, the terminal device may receive the first DCI using a first RNTI.

In some embodiments, the first RNTI may be determined according to at least one of: a time domain position of the preamble, a frequency domain position of the preamble, an identifier of the preamble, a time domain position of the first PUSCH, a frequency domain position of the first PUSCH, and an antenna port of a demodulation reference signal (DMRS) of the first PUSCH.

The time domain position of the preamble or the time domain position of the first PUSCH may refer to a first symbol in the time domain resource occupied by the preamble or by the first PUSCH, and the frequency domain position of the preamble or the frequency domain position of the first PUSCH may refer to which of PRACH resources in the frequency domain or a resource block (RB) with the smallest number in the frequency domain resource.

In some embodiments, the first RNTI may be an RA-RNTI. In this case, the terminal device or the network device may calculate the RA-RNTI according to the PRACH resource for transmitting the first message. One possible calculation approach is formula (2):

$$\text{RA-RNTI}=1+s\_id+14{\times}t\_id+14{\times}80{\times}f\_id+14{\times}80{\times}8{\times}ul\_carrier\_id \quad (2)$$

where s_id is an index of a first OFDM symbol of the PRACH resource for transmitting the first message (0≤s_id<14), t_id is an index of a first slot of the PRACH resource for transmitting the first message in a system frame (0≤t_id<80), f_id is an index of the PRACH resource for transmitting the first message in the frequency domain (0≤f_id<8), and ul_carrier_id is an unlink carrier for transmitting the first message (0 represents a NUL carrier, and 1 represents an SUL carrier, or 0 represents an unlicensed carrier, and 1 represents a licensed carrier).

After receiving the first DCI, the terminal device may send a second PUSCH to the network device, that is, retransmit the first transport block to the network device.

As an example, the terminal device may send the second PUSCH to the network device according to the response information for the preamble. For example, if the response information for the preamble includes first RV information, the terminal device may determine an RV, used when the second PUSCH is sent, according to the first RV information, and then send the second PUSCH to the network device according to the determined RV.

As another example, the terminal device may send the second PUSCH to the network device based on information preset on the terminal device, for example, information specified by the protocol.

When the first DCI schedules a first PDSCH and the first PDSCH includes the response information for the preamble, the terminal device sends the second PUSCH to the network device. Specifically, after the terminal device receives the first DCI within the duration range of the RAR timer or RAR time window, and decodes the first PDSCH according to the first DCI, then the terminal device determines whether the first PDSCH is its own PDSCH. If yes, the terminal device may retransmit the first transport block to the network device.

Exemplarily, in a process in which the terminal device determines whether the first PDSCH is its own PDSCH, the terminal device may find out whether the first PDSCH includes an identifier of the preamble sent by the terminal device, and if the first PDSCH includes the identifier of the preamble sent by the terminal device, the terminal device may determine that the first PDSCH is its own PDSCH. Then, the terminal device may retransmit the first transport block to the network device according to a TA command, UL grant and TC-RNTI or the like corresponding to the identifier of the preamble.

If the first DCI includes the response information for the preamble, after the terminal device receives the first DCI within the duration range of the RAR timer or RAR time window, the terminal device determines whether the first DCI is its own DCI, and if yes, the terminal device may retransmit the first transport block to the network device.

In some embodiments, if the first DCI includes the response information for the preamble, the first RNTI may be determined according to the identifier of the preamble and/or the antenna port of the DMRS of the first PUSCH.

After receiving the second PUSCH, the network device may combine it with data in the first PUSCH to determine whether the first transport block can be obtained successfully by coding. If the network device receives correctly the first transport block, the network device may send second DCI to the terminal device. The subsequent process will be described later, and will not be described in detailed herein for the sake of brevity.

If the network device does not receive the first transport block correctly yet, the network device may send third DCI to the terminal device, wherein the third DCI is used for scheduling transmission of a third PUSCH, and the third PUSCH includes data obtained by performing rate-matching on the first transport block. That is, if the network device does not receive the first transport block correctly yet after the terminal device retransmits the first transport block to the network device, the terminal device may continue to retransmit the first transport block to the network device.

Accordingly, the terminal device may receive the third DCI sent by the network device. As an example, if the response information for the preamble includes the TC-RNTI, the terminal device may receive the third DCI according to the TC-RNTI.

In some embodiments, the third DCI may include, but is not limited to, at least one of: an uplink and downlink DCI indicator, frequency resource allocation, time resource allocation, a frequency hopping flag, MCS, NDI, an RV, a HARQ process number, a transmit power control command for PUSCH, and a carrier indicator.

The process for the terminal device to retransmit the first transport block to the network device may be repeated until the network device receives correctly the first transport block or a quantity of retransmissions reaches the maximum quantity of retransmissions. After the network device receives the first transport block correctly, the network device may send the second DCI to the terminal device for the first transport block.

In some embodiments, the network device may send the second DCI to the terminal device according to the TC-RNTI, the first RNTI or a second RNTI, and accordingly, the terminal device may receive the second DCI according to the TC-RNTI, the first RNTI or the second RNTI.

In some embodiments, the second RNTI may be determined according to at least one of: a time domain position of the preamble, a frequency domain position of the preamble, an identifier of the preamble, a time domain position of the first PUSCH, a frequency domain position of the first PUSCH, an antenna port of a DMRS of the first PUSCH, and an identifier of the terminal device.

In some embodiments, the first DCI and the second DCI may be scrambled by using different RNTIs. Thus, the terminal device can distinguish the first DCI from the second DCI more effectively.

In some embodiments, the first PDSCH scheduled by the first DCI does not support HARQ retransmission.

In situation B, when the network device detects successfully the preamble sequence out and decodes the first transport block (i.e., situation 2 when the network device receives the first message), the network device may determine which terminal device sent the first message. In this case, the network device may send the second DCI to the terminal device.

In some embodiments, the network device may send the second DCI to the terminal device using a second CORESET, or may send the second DCI to the terminal device using other resources. The CORESET may be preset on the terminal device based on the protocol, or may be preconfigured to the terminal device by the network device.

In some embodiments, the second DCI may include response information for the first transport block; or the second DCI may be used for scheduling a second PDSCH which includes data obtained by performing rate-matching on the second transport block, and the second transport block includes the response information for the first transport block.

The response information for the first transport block may include at least one of: an identifier of the preamble, part or all of contents included in the first transport block, a TC-RNTI or C-RNTI.

Two embodiments, in which the second DCI includes the response information for the first transport block, and the second DCI is used for scheduling the second PDSCH which includes the data obtained by performing rate-matching on the second transport block, the second transport block including the response information for the first transport block, will be described respectively below.

In embodiment one, the second DCI includes the response information for the first transport block.

After receiving the second DCI, the terminal device may send acknowledgment (ACK) information to the network device. It should be understood that when the second DCI includes the response information for the first transport block, if the terminal device does not receive the second DCI, the terminal device cannot determine whether the network device sent the second DCI to itself, thus the terminal device will not send a NACK to the network device.

In this embodiment, the second DCI may include at least one of: first PUCCH resource indicator information, first PUCCH time domain position indicator information, information of first transmit power control command for PUCCH, and second carrier indicator information.

In this case, the terminal device may determine a first PUCCH resource for sending ACK information according to the second DCI, and then send the ACK information to the network device using the first PUCCH resource. Accordingly, the network device will detect whether the ACK information is included on the first PUCCH resource. In some embodiments, the network device does not detect whether NACK information is included on the first PUCCH resource.

The second DCI may include at least one of the information described above. Further, if the terminal device is configured with a carrier on an unlicensed spectrum, the second carrier indicator information may also be used for determining the unlicensed carrier for transmitting the first PUCCH. In this case, the second DCI may further include, but is not limited to: indicators of at least two first PUCCH resources, indicators of at least two first PUCCH time domain positions, a first PUCCH channel access type, and a first PUCCH channel access priority.

In embodiment two, the second DCI is used for scheduling the second PDSCH which includes data obtained by performing rate-matching on the second transport block, the second transport block including the response information for the first transport block.

In this embodiment, the second DCI may include at least one of: second PUCCH resource indicator information, PDSCH-to-HARQ feedback time indicator information, third carrier indicator information, information of second transmit power control command for PUCCH, second RV information, second NDI information, second HARQ process number information, and second MCS information. The second RV information may be used for determining a corresponding redundancy version of the second transport block when transmitted, and the second MCS information may be used for determining a corresponding modulation order and/or code rate of the second transport block when transmitted.

In this embodiment, as an example, the terminal device may have received the second DCI but failed to decode the second PDSCH, in this case the terminal device may send NACK information to the network device.

In some embodiments, the terminal device may determine a second PUCCH resource according to the second DCI or the preconfigured resource, and then send the NACK information to the network device on the second PUCCH resource.

Accordingly, after the network device receives the NACK information sent by the terminal device, the network device may send the second DCI to the terminal device for the NACK information. The second DCI is used for scheduling transmission of a third PDSCH, the third PDSCH includes data obtained by performing rate-matching on the second transport block. That is, the second DCI sent by the network device for the NACK information sent by the terminal device is used for scheduling retransmission of the second PDSCH.

For convenience of description, the second DCI for scheduling retransmission of the second PDSCH is referred to as fourth DCI in an embodiment of the present application. In some embodiments, a value of an RV in the fourth DCI may be different from a value of an RV in the second DCI. In some embodiments, a value of a modulation order in the fourth DCI may be different from a value of a modulation order in the second DCI.

It should be understood that the process of scheduling retransmission of the second PDSCH may be repeated until the terminal device feeds back ACK information to the network device or the quantity of retransmissions reaches the maximum quantity of retransmissions.

As another example, the terminal device may receive the second DCI and decode the second PDSCH, then the terminal device may send the ACK information to the network device. After the network device receives the ACK information sent by the terminal device, it is indicated that the random access procedure is completed.

In some embodiments, the terminal device may determine the second PUCCH resource according to the second DCI, and then send the ACK information to the network device on the second PUCCH resource. Alternatively, the terminal device may send the ACK information to the network device using the preconfigured second PUCCH resource.

In an embodiment of the present application, the size of the first DCI may the same as that of the second DCI. Thus, the quantity of blind detections of the PDCCH at the terminal device side can be reduced effectively.

In some embodiments, in order for the terminal device to better distinguish the first DCI from the second DCI, the first DCI and/or the second DCI may also indicate whether DCI currently received by the terminal device is the first DCI or the second DCI.

As an example, the first DCI may include a first indication information field used for indicating that DCI currently received by the terminal device is the first DCI, and/or the second DCI may include the first indication information field used for indicating that DCI currently received by the terminal device is the second DCI.

The first indication information field may include at least one bit. Exemplarily, when the first indication information field is one bit, a bit "0" may be used for indicating that DCI currently received by the terminal device is the first DCI, and a bit "1" may be used for indicating that DCI currently received by the terminal device is the second DCI. When the first indication information field is of multiple bits, if the multiple bits are the same, they may be used for indicating that the DCI currently received by the terminal device is the first DCI; if at least two of the multiple bits are different, they can be used for indicating that the DCI currently received by the terminal device is the second DCI. For example, the first indication information field includes 3 bits, if the first indication information field in the DCI currently received by the terminal device is "010", the terminal device may determine that the currently received DCI is the second DCI; if the first indication information field in the DCI currently received by the terminal device is "000", the terminal device may determine that the currently received DCI is the first DCI.

As another example, a first parameter may be used for indicating whether the DCI currently received by the terminal device is the first DCI or the second DCI. For example, if the DCI currently received by the terminal device includes the first parameter, the DCI is the first DCI; if the DCI currently received by the terminal device does not include the first parameter, the DCI is the second DCI.

It should be noted that when the first DCI includes the first indication information field, the second DCI may not include the first indication information field; or when the first DCI does not include the first indication information field, the second DCI may include the first indication information field.

An embodiment of the present application will be further described below with reference to FIG. 7. It can be seen that FIG. 7 includes technical schemes of situation A and situation B.

A terminal device sends a preamble and a first PUSCH to a network device, the first PUSCH includes data obtained by performing rate-matching on a first transport block. Then, the network device detects the preamble and the first transport block. If the network device receives the preamble, the network device sends first DCI scrambled by a first RNTI to the terminal device, the first DCI is used for scheduling a first PDSCH, and the first PDSCH includes the response information for the preamble (situation A). If the network device receives the first transport block, the network device may send second DCI scrambled by a second RNTI to the terminal device, wherein the second DCI is used for scheduling the second PDSCH which includes data obtained by performing rate-matching on a second transport block, wherein the second transport block includes the response information for the first transport block.

Next, the terminal device receives the first DCI or the second DCI within an RAR time window. If the terminal device receives the first DCI and an RAR grant, the terminal device may determine that the network device fails to decode the first transport block, and then the terminal device may send a second PUSCH to the network device according to information used for PUSCH retransmission, such as an RV in the RAR, the second PUSCH includes data obtained by performing rate-matching on the first transport block, that is, the terminal device retransmits the first transport block to the network device.

If the terminal device receives the second DCI and decodes a second PDSCH, the terminal device sends ACK information to the network device, indicating that the random access is successful. If the terminal device receives the second DCI but fails to decode the second PDSCH, the terminal device sends NACK information to the network device to request retransmission of the second PDSCH.

Figure 7:
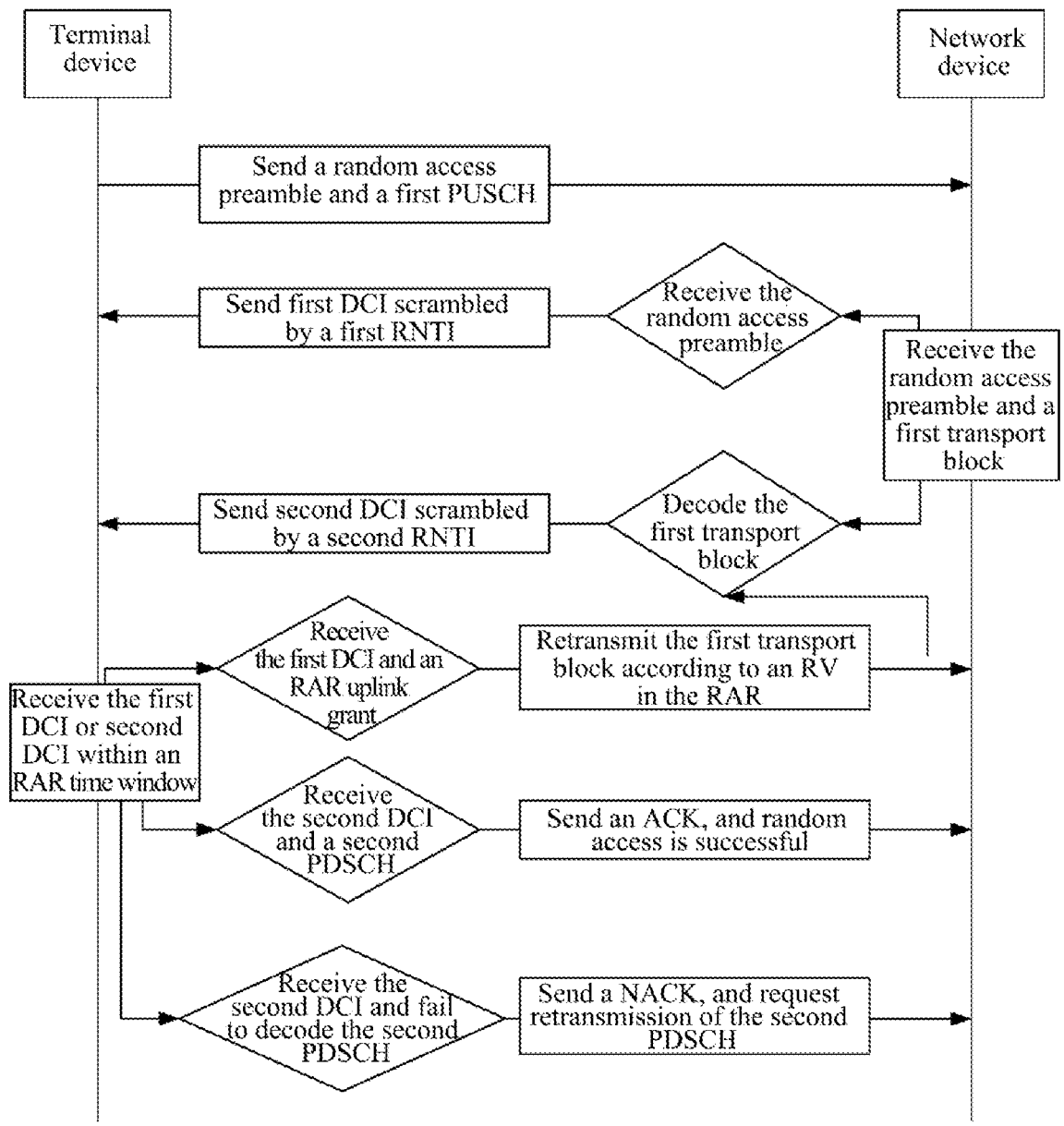
FIG. 7 is a schematic diagram of a specific implementation of a random access method in accordance with an embodiment of the present application.

It should be understood that FIG. 7 is only a possible example of an embodiment of the present application, and should not be considered as a limitation on the embodiments of the present application.

It should be understood that in the embodiments of the present application, "first", "second", "third" and "fourth" are only intended to distinguish different objects, and should not be considered as a limitation on the scope of the embodiments of the present application. In the embodiment of the present application, in the two-step random access procedure, after the terminal device sends the first message to the network device, the network device may send different DCIs to the terminal device according to different situations when the first message is received. After receiving different DCIs, the terminal device can distinguish effectively between two situations when the network device receives the first message, so that subsequent procedure in the two-step random access procedure can be performed according to different situations when the network device receives the first message.

The preferred embodiments of the present application have been described in detail above with reference to the accompanying drawings. However, the present application is not limited to specific details of the embodiments described above, and various simple variations may be made to the technical schemes of the present application within the technical conception scope of the present application, and these simple variations are all within the protection scope of the present application.

For example, various specific technical features described in the specific embodiments described above may be combined in any suitable mode without conflict. In order to avoid unnecessary repetition, various possible combination modes will not be further explained in the present application.

As another example, various different embodiments of the present application may be combined arbitrarily as long as they do not violate the idea of the present application, and the combinations should be regarded as the contents disclosed in the present application as well.

It should be understood that sequence numbers of the foregoing processes do not mean execution sequences in various method embodiments of the present application. The execution sequences of the processes should be determined according to functions and internal logics of the processes, and should not be construed as any limitation on the implementation processes of the embodiments of the present application.

The communication methods in accordance with the embodiments of the present application have been described in detail above, and communication devices in accordance with the embodiments of the present application will be described below with reference to FIGS. 8 to 10. The technical features described in the method embodiments are applicable to the following device embodiments.

Figure 8:
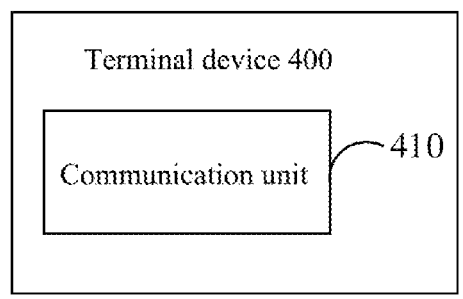
FIG. 8 is a schematic block diagram of a terminal device in accordance with an embodiment of the present application.

FIG. 8 shows a schematic block diagram of a terminal device 400 in accordance with an embodiment of the present application. As shown in FIG. 8, the terminal device 400 includes a communication unit 410 configured to send a first message to a network device, wherein the first message includes a random access preamble and a first PUSCH, and the first PUSCH includes data obtained by performing rate-matching on a first transport block.

The communication unit 410 is further configured to receive first DCI or second DCI sent by the network device, wherein the first DCI or the second DCI is sent for the first message.

In some embodiments, the first DCI is used for scheduling a first PDSCH, and the first PDSCH includes response information for the random access preamble; or the first DCI includes response information for the random access preamble.

In some embodiments, the response information for the random access preamble includes at least one of: an identifier of the random access preamble, a TC-RNTI, first RV information, first NDI information, first carrier indicator information, first HARQ process number information, first MCS information and information of transmit power control command for PUSCH.

In some embodiments, the response information for the random access preamble includes the first RV information which is used for determining a redundancy version of a second PUSCH; and/or the response information for the random access preamble includes the first MCS information which is used for determining a modulation order of the second PUSCH; and/or the response information for the random access preamble includes the information of transmit power control command for PUSCH which is used for determining transmission power of the second PUSCH according to transmission power of the first PUSCH; and/or the response information for the random access preamble includes the first carrier indicator information which is used for determining carrier information for transmitting the second PUSCH;

wherein the second PUSCH includes data obtained by performing rate-matching on the first transport block.

In some embodiments, the communication unit 410 is further configured to send the second PUSCH to the network device according to the response information for the random access preamble, wherein the second PUSCH includes data obtained by performing rate-matching on the first transport block.

In some embodiments, the communication unit 410 is further configured to receive third DCI, wherein the third DCI is used for scheduling transmission of a third PUSCH, and the third PUSCH includes data obtained by performing rate-matching on the first transport block.

In some embodiments, if the response information for the random access preamble includes a TC-RNTI, the communication unit 410 is specifically configured to receive the third DCI according to the TC-RNTI.

In some embodiments, the communication unit 410 is further configured to receive the second DCI sent by the network device for the first transport block.

In some embodiments, the second DCI includes the response information for the first transport block.

In some embodiments, the communication unit 410 is further configured to send an acknowledgement to the network device.

In some embodiments, the second DCI includes at least one of: first PUCCH resource indicator information, first PUCCH time domain position indicator information, information of first transmit power control command for PUCCH, and second carrier indicator information.

The communication unit 410 is specifically configured to send the acknowledgement to the network device according to the second DCI.

In some embodiments, the second DCI is used for scheduling a second PDSCH which includes data obtained by performing rate-matching on a second transport block, wherein the second transport block includes the response information for the first transport block.

In some embodiments, the communication unit 410 is further configured to send a negative acknowledgement to the network device if the terminal device 400 receives the second DCI and fails to decode the second PDSCH; or send the acknowledgement to the network device if the terminal device 400 receives the second DCI and decodes the second PDSCH.

In some embodiments, if the communication unit 410 sends a negative acknowledgement to the network device, the communication unit 410 is further configured to receive the second DCI sent by the network device for the negative acknowledgement, wherein the second DCI is used for scheduling transmission of a third PDSCH, and the third PDSCH includes data obtained by performing rate-matching on the second transport block.

In some embodiments, the second DCI includes at least one of: second PUCCH resource indicator information, PDSCH-to-HARQ feedback time indicator information, third carrier indicator information, information of second transmit power control command for PUCCH, second RV information, second NDI information, second HARQ process number information, and second MCS information.

In some embodiments, the second DCI includes the second RV information which is used for determining a redundancy version of the second transport block when transmitted; and/or the second DCI includes the second MCS information which is used for determining a corresponding modulation order or code rate of the second transport block when transmitted.

In some embodiments, the response information for the first transport block includes at least one of: an identifier of the random access preamble, part or all of contents included in the first transport block, a TC-RNTI or C-RNTI.

In some embodiments, a size of the first DCI is the same as that of the second DCI.

In some embodiments, the first DCI includes a first indication information field, and the first indication information field in the first DCI is used for indicating that DCI currently received by the terminal device is the first DCI; and the second DCI also includes the first indication information field, and the first indication information field in the second DCI is used for indicating that DCI currently received by the terminal device is the second DCI.

In some embodiments, the communication unit 410 is specifically configured to receive the first DCI sent by the network device using a first control resource set; or receive the second DCI sent by the network device using a second control resource set.

In some embodiments, the communication unit 410 is specifically configured to receive the first DCI according to a first RNTI.

In some embodiments, the communication unit 410 is specifically configured to receive the second DCI according to the first RNTI.

In some embodiments, the first RNTI is determined according to at least one of: a time domain position of the random access preamble, a frequency domain position of the random access preamble, an identifier of the random access preamble, a time domain position of the first PUSCH, a frequency domain position of the first PUSCH, and an antenna port of a demodulation reference signal (DMRS) of the first PUSCH.

In some embodiments, the communication unit 410 is specifically configured to receive the second DCI according to a second RNTI.

In some embodiments, the second RNTI is determined according to at least one of: a time domain position of the random access preamble, a frequency domain position of the random access preamble, an identifier of the random access preamble, a time domain position of the first PUSCH, a frequency domain position of the first PUSCH, an antenna port of a DMRS of the first PUSCH, and an identifier of the terminal device, wherein the first transport block includes the identifier of the terminal device.

In some embodiments, an RV used when the terminal device transmits the first PUSCH is RV0.

It should be understood that the terminal device 400 may correspond to the terminal device in the method 300, and may implement corresponding operations of the terminal device in the method 300, which will not be repeated herein for brevity.

Figure 9:
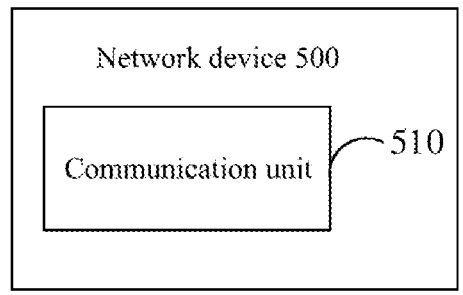
FIG. 9 is a schematic block diagram of a network device in accordance with an embodiment of the present application.

FIG. 9 is a schematic block diagram of a network device 500 in accordance with an embodiment of the present application. As shown in FIG. 9, the network device 500 includes: a communication unit 510 configured to receive a first message sent by a terminal device, wherein the first message includes a random access preamble and a first PUSCH, and the first PUSCH includes data obtained by performing rate-matching on a first transport block.

The communication unit 510 is further configured to send first DCI or second DCI to the terminal device according to a result of reception of the first message.

In some embodiments, the first DCI is used for scheduling a first physical downlink shared channel (PDSCH), and the first PDSCH includes response information for the random access preamble; or the first DCI includes the response information for the random access preamble.

In some embodiments, the response information for the random access preamble includes at least one of: an identifier of the random access preamble, a TC-RNTI, first RV information, first NDI information, first carrier indicator information, first HARQ process number information, first MCS information, and information of transmit power control command for PUSCH.

In some embodiments, the response information for the random access preamble includes the first RV information which is used for determining a redundancy version of a second PUSCH; and/or the response information for the random access preamble includes the first MCS information which is used for determining a modulation order of the second PUSCH; and/or the response information for the random access preamble includes the information of transmit power control command for PUSCH which is used for determining transmission power of the second PUSCH according to transmission power of the first PUSCH; and/or the response information for the random access preamble includes the first carrier indicator information which is used for determining carrier information for transmitting the second PUSCH;

wherein the second PUSCH includes data obtained by performing rate-matching on the first transport block.

In some embodiments, the communication unit 510 is further configured to receive a second PUSCH sent by the terminal device, wherein the second PUSCH includes data obtained by performing rate-matching on the first transport block.

In some embodiments, the communication unit 510 is further configured to send third DCI to the terminal device, wherein the third DCI is used for scheduling transmission of a third PUSCH, and the third PUSCH includes data obtained by performing rate-matching on the first transport block.

In some embodiments, if the response information for the random access preamble includes a TC-RNTI, the communication unit 510 is specifically configured to send the third DCI to the terminal device according to the TC-RNTI.

In some embodiments, the communication unit 510 is further configured to send the second DCI to the terminal device for the first transport block.

In some embodiments, the second DCI includes response information for the first transport block.

In some embodiments, the communication unit 510 is further configured to receive an acknowledgement sent by the terminal device.

In some embodiments, the second DCI includes at least one of: first PUCCH resource indicator information, first PUCCH time domain position indicator information, information of first transmit power control command for PUCCH, and second carrier indicator information; the communication unit 510 is specifically configured to receive the acknowledgement sent by the terminal device according to the second DCI.

In some embodiments, the second DCI is used for scheduling a second PDSCH which includes data obtained by performing rate-matching on a second transport block, wherein the second transport block includes the response information for the first transport block.

In some embodiments, the communication unit 510 is further configured to receive a negative acknowledgement sent by the terminal device if the terminal device receives the second DCI and fails to decode the second PDSCH; or receive the acknowledgement sent by the terminal device if the terminal device receives the second DCI and decodes the second PDSCH.

In some embodiments, if the communication unit 510 receives the negative acknowledgement sent by the terminal device, the communication unit 510 is further configured to send the second DCI to the terminal device for the negative acknowledgement, wherein the second DCI is used for scheduling transmission of a third PDSCH including data obtained by performing rate-matching on the second transport block.

In some embodiments, the second DCI includes at least one of: second PUCCH resource indicator information, PDSCH-to-HARQ feedback time indicator information, third carrier indicator information, information of second transmit power control command for PUCCH, second RV information, second NDI information, second HARQ process number information, and second MCS information.

In some embodiments, the second DCI includes the second RV information which is used for determining a redundancy version of the second transport block when transmitted; and/or the second DCI includes the second MCS information which is used for determining a corresponding modulation order or code rate of the second transport block when transmitted.

In some embodiments, the response information for the first transport block includes at least one of: an identifier of the random access preamble, part or all of contents included in the first transport block, a TC-RNTI or C-RNTI.

In some embodiments, a size of the first DCI is the same as that of the second DCI.

In some embodiments, the first DCI includes a first indication information field, and the first indication information field in the first DCI is used for indicating that DCI currently received by the terminal device is the first DCI; and the second DCI also includes the first indication information field, and the first indication information field in the second DCI is used for indicating that DCI currently received by the terminal device is the second DCI.

In some embodiments, the communication unit 510 is specifically configured to send the first DCI using a first control resource set according to the result of reception of the first message; or send the second DCI using a second control resource set according to the result of the reception of the first message.

In some embodiments, the communication unit 510 is specifically configured to send the first DCI according to a first RNTI.

In some embodiments, the communication unit 510 is specifically configured to send the second DCI according to the first RNTI.

In some embodiments, the first RNTI is determined according to at least one of: a time domain position of the random access preamble, a frequency domain position of the random access preamble, an identifier of the random access preamble, a time domain position of the first PUSCH, a frequency domain position of the first PUSCH, and an antenna port of a DMRS of the first PUSCH.

In some embodiments, the communication unit 510 is specifically configured to send the second DCI according to a second RNTI.

In some embodiments, the second RNTI is determined according to at least one of: a time domain position of the random access preamble, a frequency domain position of the random access preamble, an identifier of the random access preamble, a time domain position of the first PUSCH, a frequency domain position of the first PUSCH, an antenna port of a DMRS of the first PUSCH, and an identifier of the terminal device, wherein the first transport block includes the identifier of the terminal device.

It should be understood that the network device 500 may correspond to the network device in the method 300, and may implement corresponding operations implemented by the network device in the method 300, which will not be repeated herein for brevity.

Figure 10:
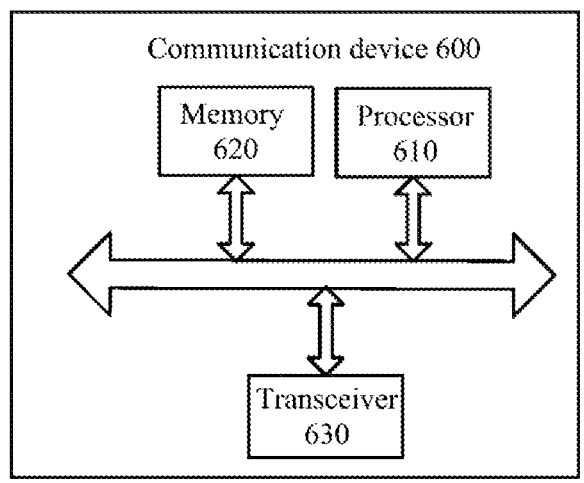
FIG. 10 is a schematic block diagram of a communication device in accordance with an embodiment of the present application.

FIG. 10 is a schematic diagram of a structure of a communication device 600 in accordance with an embodiment of the present application. The communication device 600 shown in FIG. 10 includes a processor 610, which may invoke and run a computer program from a memory to implement the methods in accordance with the embodiments of the present application.

In some embodiments, as shown in FIG. 10, the communication device 600 may further include a memory 620. The processor 610 may invoke and run the computer program from the memory 620 to implement the methods in accordance with the embodiments of the present application.

The memory 620 may be a separate device independent of the processor 610 or may be integrated in the processor 610.

In some embodiments, as shown in FIG. 10, the communication device 600 may further include a transceiver 630. The processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, the quantity of which may be one or more.

In some embodiments, the communication device 600 may specifically be the network device in the embodiments of the present application, and the communication device 600 may implement the corresponding processes implemented by the network device in various methods in accordance with the embodiments of the present application, which will not be repeated herein for brevity.

In some embodiments, the communication device 600 may specifically be the terminal device in the embodiments of the present application, and the communication device 600 may implement the corresponding processes implemented by the terminal device in various methods in accordance with the embodiments of the present application, which will not be repeated herein for brevity.

Figure 11:
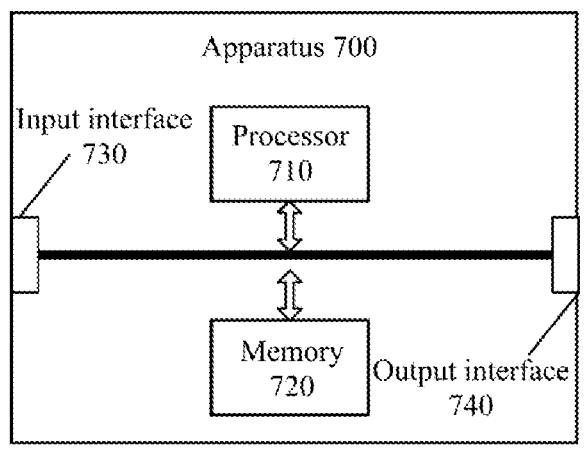
FIG. 11 is a schematic block diagram of an apparatus in accordance with an embodiment of the present application.

FIG. 11 is a schematic diagram of a structure of an apparatus in accordance with an embodiment of the present application. The apparatus 700 shown in FIG. 11 includes a processor 710. The processor 710 may invoke and run a computer program from a memory to implement the methods in accordance with the embodiments of the present application.

In some embodiments, as shown in FIG. 11, the apparatus 700 may further include a memory 720. The processor 710 may invoke and run the computer program from the memory 720 to implement the methods in accordance with the embodiments of the present application.

The memory 720 may be a separate device independent of the processor 710 or may be integrated in the processor 710.

In some embodiments, the apparatus 700 may further include an input interface 730. The processor 710 may control the input interface 730 to communicate with other devices or chips. Specifically, the processor 710 may acquire information or data sent by other devices or chips.

In some embodiments, the apparatus 700 may further include an output interface 740. The processor 710 may control the output interface 740 to communicate with other devices or chips. Specifically, the processor 710 may output information or data to other devices or chips. In some embodiments, the apparatus may be applied to the terminal device in the embodiments of the present application, and the apparatus may implement the corresponding processes implemented by the terminal device in various methods in accordance with the embodiments of the present application, which will not be repeated herein for brevity.

In some embodiments, the apparatus may be applied to the network device in the embodiments of the present application, and the apparatus may implement the corresponding processes implemented by the network device in various methods in accordance with the embodiments of the present application, which will not be repeated herein for brevity.

In some embodiments, the apparatus 700 may be a chip. It should be understood that the chip mentioned in the embodiments of the present application may be referred to as a system-level chip, a system chip, a chip system or a system-on-chip, etc.

It should be understood that the processor in the embodiments of the present application may be an integrated circuit chip having a signal processing capability. In an implementation process, each of the acts of the foregoing method embodiments may be completed through an integrated logic circuit of hardware in the processor or instructions in a form of software. The processor described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform various methods, acts and logical block diagrams disclosed in the embodiments of the present application. The general purpose processor may be a microprocessor, or the processor may also be any conventional processor, or the like. The acts of the methods disclosed in the embodiments of the present application may be directly embodied to be completed by a hardware decoding processor, or may be completed by a combination of hardware in the decoding processor and software modules. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the acts of the foregoing methods in combination with its hardware.

It may be understood that the memory in the embodiments of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus dynamic random access memory (DR RAM). It should be noted that the memory in the systems and methods described herein is intended to include, but is not limited to, these and any other suitable types of memories.

It should be understood that the foregoing memory is described in an exemplary but non-limiting sense. For example, the memory in the embodiments of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the embodiments of the present application is intended to include, but is not limited to, these and any other suitable types of memories.

Figure 12:
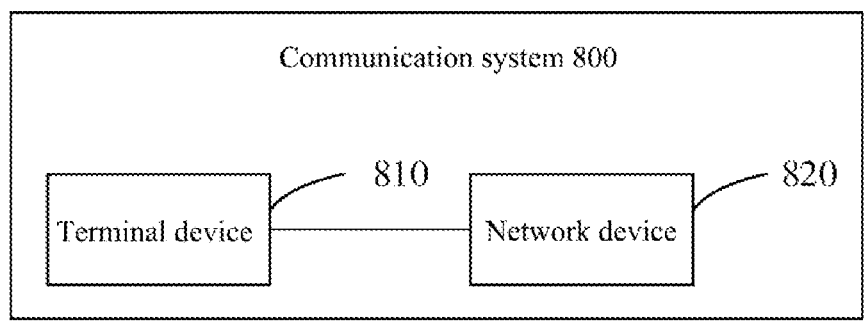
FIG. 12 is a schematic block diagram of a communication system in accordance with an embodiment of the present application.

FIG. 12 is a schematic block diagram of a communication system 800 in accordance with an embodiment of the present application. As shown in FIG. 12, the communication system 800 may include a terminal device 810 and a network device 820.

Herein, the terminal device 810 may be configured to implement the corresponding functions implemented by the terminal device in the above methods, and the network device 820 may be configured to implement the corresponding functions implemented by the network device in the above methods, which will not be repeated herein for brevity.

An embodiment of the present application further provides a computer-readable storage medium configured to store a computer program.

In some embodiments, the computer-readable storage medium may be applied in the terminal device in the embodiments of the present application, and the computer program enables a computer to perform the corresponding processes implemented by the terminal device in various methods of the embodiments of the present application, which will not be repeated herein for brevity.

In some embodiments, the computer-readable storage medium may be applied in the network device in the embodiments of the present application, and the computer program enables a computer to perform the corresponding processes implemented by the network device in various methods of the embodiments of the present application, which will not be repeated herein for brevity.

An embodiment of the present application further provides a computer program product including computer program instructions.

In some embodiments, the computer program product may be applied in the terminal device in the embodiments of the present application, and the computer program instructions enable a computer to perform the corresponding processes implemented by the terminal device in various methods of the embodiments of the present application, which will not be repeated herein for brevity.

In some embodiments, the computer program product may be applied in the network device in the embodiments of the present application, and the computer program instructions enable a computer to perform the corresponding processes implemented by the network device in various methods of the embodiments of the present application, which will not be repeated herein for brevity.

An embodiment of the present application further provides a computer program.

In some embodiments, the computer program may be applied to the terminal device in the embodiments of the present application, and the computer program, when running on a computer, enables the computer to perform the corresponding processes implemented by the terminal device in various methods of the embodiments of the present application, which will not be repeated herein for brevity.

In some embodiments, the computer program may be applied to the network device in the embodiments of the present application, and the computer program, when running on a computer, enables the computer to perform the corresponding processes implemented by the network device in various methods of the embodiments of the present application, which will not be repeated herein for brevity.

A person of ordinary skill in the art may recognize that the elements and algorithm acts in various examples described in combination with the embodiments disclosed herein can be implemented in electronic hardware, or a combination of computer software and electronic hardware. Whether these functions are implemented in hardware or software depends on the specific application and design constraints of the technical scheme. Skilled artisans may use different methods to implement the described functions for each particular application, but such an implementation should not be considered to be beyond the scope of the present application.

Those skilled in the art may clearly understand that for the sake of convenience and conciseness of description, the specific working processes of the systems, devices and units described above may be described with reference to the corresponding processes in the above method embodiments and will not be repeated herein.

In several embodiments provided by the present application, it should be understood that the disclosed systems, devices and methods may be implemented in other ways. For example, the device embodiments described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the objective of the schemes of the embodiments.

In addition, various functional units in various embodiments of the present application may be integrated into one processing unit, or may exist physically separately, or two or more than two units may be integrated into one unit.

The function, if implemented in a form of software functional unit and sold or used as an independent product, may be stored in a computer-readable storage medium. Based on such understanding, the technical scheme of the present application, in essence, or the part contributing to the prior art, or the part of the technical scheme, may be embodied in the form of a software product, which is stored in a storage medium, and includes multiple instructions for enabling a computer device (which may be a personal computer, a server, or a network device, etc.) to perform all or part of the acts of various embodiments of the present application. The aforementioned storage medium includes various media, such as a U disk, a mobile hard disk, a read-only memory (ROM), a random access memory (RAM), a magnetic disk, or an optical disk, which are capable of storing program codes.

What are described above are merely specific implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

What we claim is:

1. A random access method, comprising:
   sending, by a terminal device, a first message to a network device, wherein the first message comprises a random access preamble and a first physical uplink shared channel (PUSCH), and the first PUSCH comprises data of a first transport block after rate matching;
   receiving, by the terminal device, first downlink control information (DCI) sent by the network device when the random access preamble is detected successfully and the first transport block is decoded unsuccessfully, wherein the first DCI is sent in response to the first message, and the first DCI is used for scheduling a first physical downlink shared channel (PDSCH), and the first PDSCH comprises information in response to the random access preamble;
   receiving, by the terminal device, second downlink control information (DCI) sent by the network device when the random access preamble is detected successfully and the first transport block is decoded successfully, wherein the second DCI is sent in response to the first message; and the second DCI is used for scheduling a second physical downlink shared channel (PDSCH) which comprises data of a second transport block after rate matching, wherein the second transport block comprises information in response to the first transport block;
   sending, by the terminal device, a second PUSCH to the network device according to the information in response to the random access preamble if the terminal device receives the first DCI, wherein the second PUSCH comprises data of the first transport block after rate matching;
   sending, by the terminal device, a negative acknowledgement to the network device if the terminal device receives the second DCI and fails to decode the second PDSCH in a random access procedure; and sending, by the terminal device, an acknowledgement to the network device if the terminal device receives the second DCI and decodes the second PDSCH in the random access procedure;
   wherein the first DCI is scrambled according to a first radio network temporary identifier (RNTI); the second DCI is scrambled according to a second RNTI; the first RNTI and the second RNTI are different.

2. The method according to claim 1, wherein the second RNTI is determined according to an identifier of the terminal device, wherein the first transport block comprises the identifier of the terminal device.

3. A random access method, comprising:
   receiving, by a network device, a first message sent by a terminal device, wherein the first message comprises a random access preamble and a first physical uplink shared channel (PUSCH), and the first PUSCH comprises data of a first transport block after rate matching;
   sending, by the network device, first downlink control information (DCI) to the terminal device when the network device detects the random access preamble out successfully and decodes the first transport block unsuccessfully; wherein the first DCI is used for scheduling a first physical downlink shared channel (PDSCH), and the first PDSCH comprises information in response to the random access preamble;
   sending, by the network device, second downlink control information (DCI) to the terminal device when the network device detects the random access preamble out successfully and decodes the first transport block successfully; wherein the second DCI is used for scheduling a second physical downlink shared channel (PDSCH) which comprises data of a second transport block after rate matching, wherein the second transport block comprises information in response to the first transport block;
   receiving, by the network device, a second PUSCH that is sent according to the information in response to the random access preamble by the terminal device if the first DCI is sent by the network device, wherein the second PUSCH comprises data of the first transport block after rate matching;
   receiving, by the network device, a negative acknowledgement sent by the terminal device if the second DCI is received but the second PDSCH fails to be decoded by the terminal device in a random access procedure; and
   receiving, by the network device, an acknowledgement sent by the terminal device if the second DCI is received and the second PDSCH is decoded by the terminal device in the random access procedure;
   wherein the first DCI is scrambled according to a first radio network temporary identifier (fRNTI); the second DCI is scrambled according to a second RNTI; the first RNTI and the second RNTI are different.

4. The method according to claim 3, wherein the second RNTI is determined according to an identifier of the terminal device, wherein the first transport block comprises the identifier of the terminal device.

5. A terminal device, comprising:
a transceiver, configured to send a first message to a network device, wherein the first message comprises a random access preamble and a first physical uplink shared channel (PUSCH), and the first PUSCH comprises data of a first transport block after rate matching;
wherein the transceiver is further configured to receive first downlink control information (DCI) sent by the network device when the random access preamble is detected successfully and the first transport block is decoded unsuccessfully, wherein the first DCI is sent in response to the first message, and the first DCI is used for scheduling a first physical downlink shared channel (PDSCH), and the first PDSCH comprises information in response to the random access preamble;
wherein the transceiver is further configured to receive second downlink control information (DCI) sent by the network device when the random access preamble is detected successfully and the first transport block is decoded successfully, wherein the second DCI is sent in response to the first message; and the second DCI is used for scheduling a second physical downlink shared channel (PDSCH) which comprises data of a second transport block after rate matching, wherein the second transport block comprises information in response to the first transport block;
the transceiver is further configured to send a second PUSCH to the network device according to the information in response to the random access preamble if the terminal device receives the first DCI, wherein the second PUSCH comprises data of the first transport block after rate matching;
the transceiver is further configured to send a negative acknowledgement to the network device if the terminal device receives the second DCI and fails to decode the second PDSCH in a random access procedure; and send an acknowledgement to the network device if the terminal device receives the second DCI and decodes the second PDSCH in the random access procedure;
wherein the first DCI is scrambled according to a first radio network temporary identifier (RNTI); the second DCI is scrambled according to a second RNTI; the first RNTI and the second RNTI are different.

6. The terminal device according to claim 5, wherein the second RNTI is determined according to an identifier of the terminal device, wherein the first transport block comprises the identifier of the terminal device.

* * * * *